(12) United States Patent
Dakroub et al.

(10) Patent No.: US 8,422,172 B1
(45) Date of Patent: Apr. 16, 2013

(54) ACTUATOR TRACE THROUGH A DIE

(75) Inventors: Housan Dakroub, Shakopee, MN (US);
Dennis Hogg, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 366 days.

(21) Appl. No.: 12/895,854

(22) Filed: Oct. 1, 2010

(51) Int. Cl.
*G11B 5/48* (2006.01)
(52) U.S. Cl.
USPC .................................................. 360/245.9
(58) Field of Classification Search ............... 360/245.9
See application file for complete search history.

(56) References Cited

U.S. PATENT DOCUMENTS

| | | | | |
|---|---|---|---|---|
| 6,635,956 B2 * | 10/2003 | Sakamoto et al. | ............ | 257/678 |
| 7,468,866 B2 * | 12/2008 | Yang et al. | .................. | 360/245.9 |
| 7,489,482 B2 * | 2/2009 | Ono et al. | ..................... | 360/323 |
| 8,238,061 B2 * | 8/2012 | Razak | ......................... | 360/264.2 |
| 2007/0285843 A1 * | 12/2007 | Tran | ........................... | 360/245.9 |

* cited by examiner

*Primary Examiner* — Mark Blouin (57) ABSTRACT

A disk drive is disclosed. The disk drive comprises a disk, a head configured to write data to and read data from the disk, and an actuator configured to position the head relative to the disk. The disk drive also comprises a die including internal circuitry electrically coupled to the head and a bypass trace electrically coupled to the actuator, wherein the internal circuitry comprises one or more preamplifiers and the bypass trace is electrically isolated from the internal circuitry.

22 Claims, 8 Drawing Sheets

ACTUATOR TRACE THROUGH A DIE

BACKGROUND

A disk drive comprises a rotating disk and a head actuated over the disk to magnetically write to and read data from the disk. The disk drive may also comprise an actuator arm and a suspension assembly attached to the distal end of the actuator arm with the head mounted on the suspension assembly. The disk drive may comprise a first actuator (e.g., voice coil motor) for positioning the head by rotating the actuator arm about a pivot. The suspension assembly may include a second actuator for fine positioning of the head by moving the head relative to the actuator arm.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
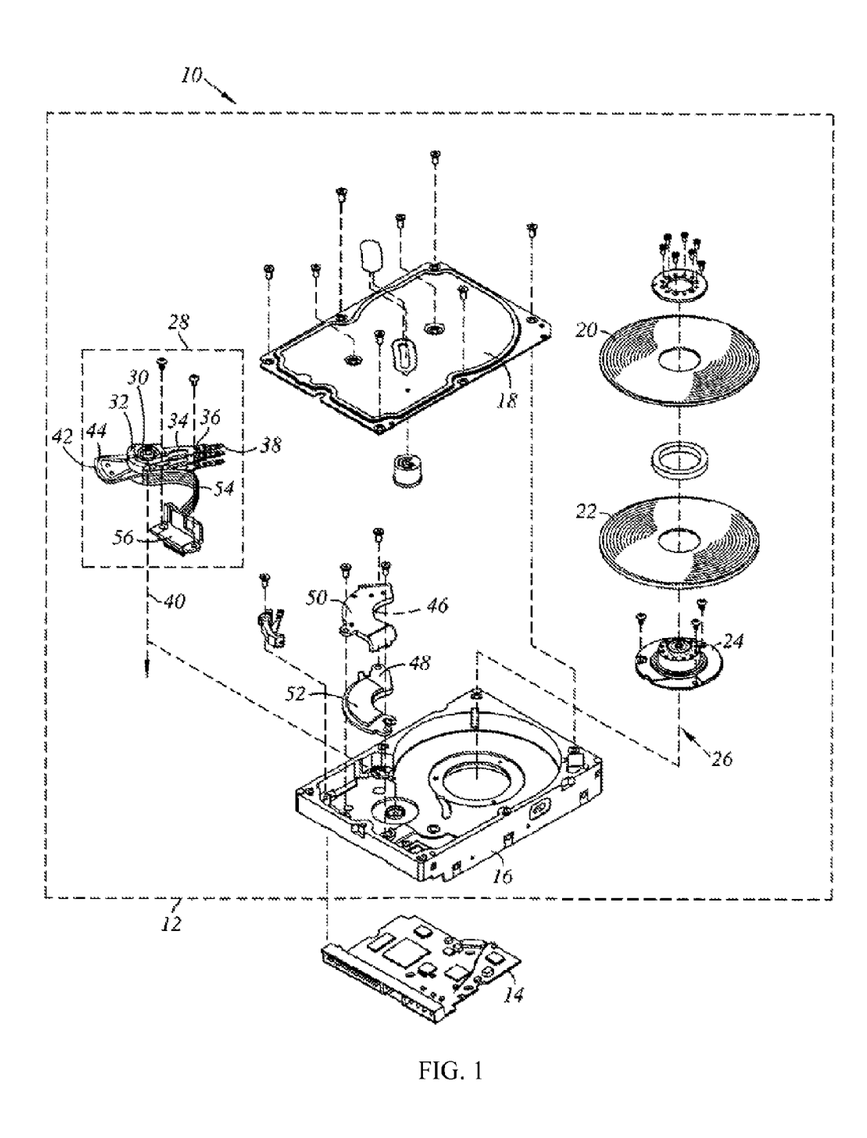
FIG. 1 shows an exploded perspective view of a disk drive according to an embodiment of the present invention.

FIG. 1 shows an exploded perspective view of a disk drive 10 according to an embodiment of the present invention. The disk drive 10 comprises a head disk assembly (HDA) 12 and a printed circuit board (PCB) 14. The head disk assembly 12 comprises a disk drive housing, which may include a base 16 and a cover 18 that collectively house a plurality of magnetic disks 20, 22. Each magnetic disk 20, 22 may include a plurality of circular data tracks on one or both surfaces of the disk for storing data.

The head disk assembly 12 also comprises a spindle motor 24 for rotating the disks 20, 22 about an axis of rotation 26. The head disk assembly further comprises a head stack assembly 28 rotatably attached to the base 16 of the disk drive 10. The head stack assembly 28 comprises an actuator 30. In the example shown in FIG. 1, the actuator 30 comprises an actuator body 32 and a plurality of actuator arms 34 extending from the actuator body 32. Attached to the distal end of each actuator arm 34 is a suspension assembly 36. Each suspension assembly 36 supports a slider 38, which includes a transducer head (shown in FIG. 3). Each transducer head may be configured to magnetically read data from and write data on a surface of one of the disks 20, 22.

The actuator 30 comprises a pivot bearing cartridge engaged within a bore of the actuator body 32 for rotating the actuator body 32 about an axis of rotation 40. The actuator 30 further comprises a coil 44 and a coil support 42 supporting the coil 44. In the example in FIG. 1, the coil support 42 extends from one side of the actuator body 32 opposite the actuator arms 34. A pair of magnetic elements 46, 48 is supported by mounts 50, 52, which are attached to the base 16. The coil 44 interacts magnetically with the magnetic elements 46, 48 to form a voice coil motor for controllably rotating the actuator arms 34 about the axis 40 based on a current through the coil 44. During operation, the actuator arms 34 may be rotated by the voice coil motor to adjust the positions of the transducer heads relative to the respective disk surfaces. For example, the actuator arms 34 may be rotated to position one of the transducer heads to a desired track on the respective disk surface.

The head stack assembly 28 further comprises a flex circuit assembly 54 and a connector 56. The connector 56 is attached to the base 16 of the disk drive and is electrically coupled to the printed circuit board (PCB) 14. The flex circuit assembly 54 is used to supply current to the coil 44 of the voice coil motor and to carry signals between the transducer heads of the sliders 38 and the printed circuit board 14. The flex circuit assembly 54 may be configured to flex in response to movement of the actuator arms 34.

Figure 2:
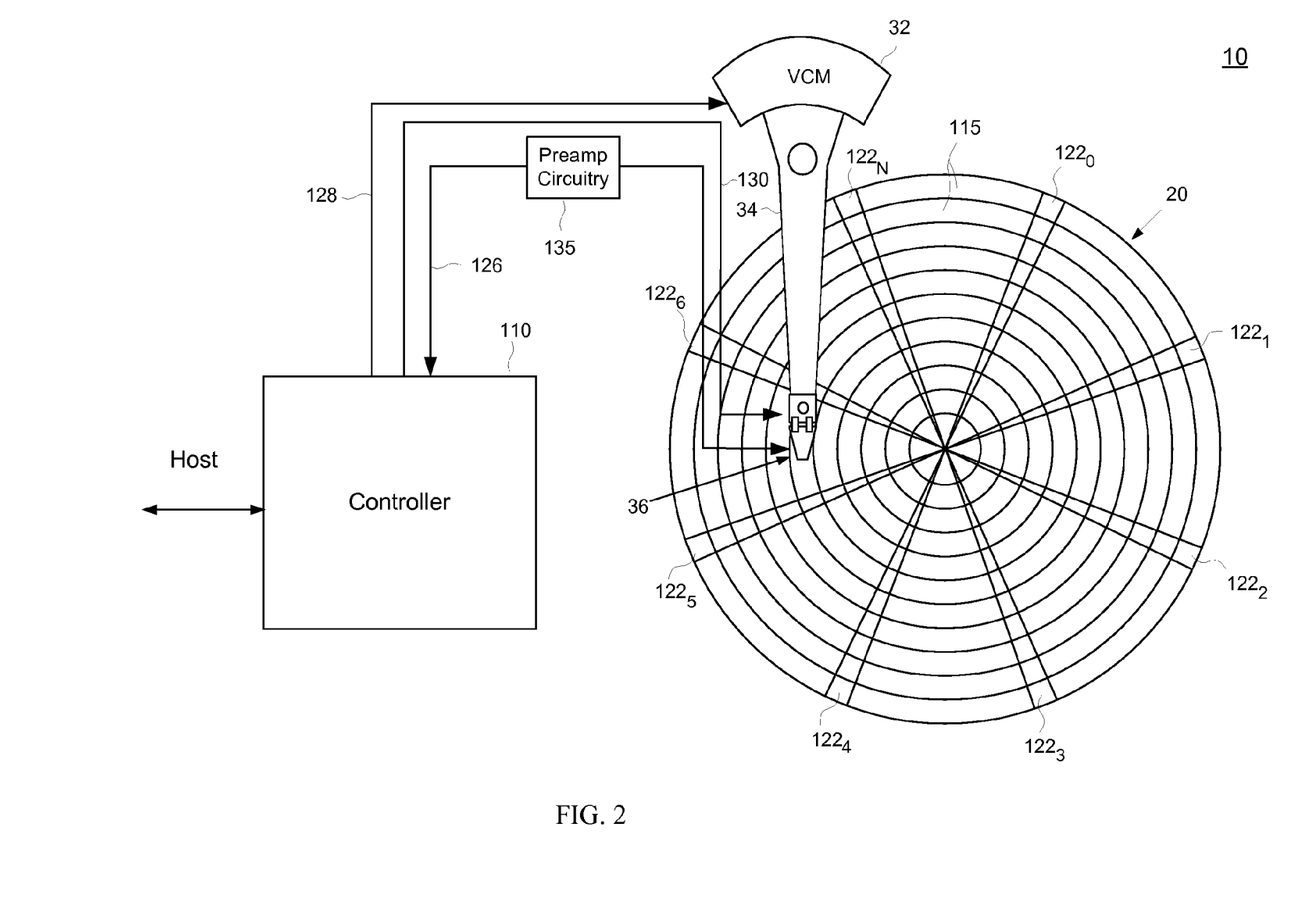
FIG. 2 is a block diagram of a disk drive according to an embodiment of the present invention.

FIG. 2 is a block diagram of the disk drive 10 according to an embodiment of the present invention. FIG. 2 shows a top view of one of the disk surfaces 20 and the corresponding actuator arm 34 and suspension assembly 36. As discussed above, the actuator arm 34 is rotated about the axis 40 by the voice coil motor (VCM) to position the corresponding transducer head radially over the disk 20. The suspension assembly 36 may also comprise a small actuator to provide fine positioning of the transducer head over the disk 20, an example of which will be discussed below with reference to FIG. 3.

The disk drive 10 also comprises a controller 110 that performs various operations of the disk drive 10 described herein. The controller 110 may be mounted on the printed circuit board (PCB) 14 shown in FIG. 1 and may be electrically coupled to the transducer head via the connector 56 and the flex circuit assembly 54 shown in FIG. 1. The controller 110 may be implemented using one or more processors for executing instructions and may further include memory, such as a volatile or non-volatile memory, for storing data (e.g., data being processed) and/or instructions. The instructions may be executed by the one or more processors to perform the various functions of the controller 110 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

As shown in FIG. 2, the disk 20 comprises a number of radially spaced, concentric tracks 115. Each track 115 may be divided into a number of data sectors (not shown) that are spaced circumferentially along the track 115. The disk 20 may also comprise a plurality of angularly spaced servo wedges $122_0$-$122_N$, each of which may include embedded servo information (e.g., servo burst) that can be read from the disk 20 by the transducer head to determine the position of the head transducer head over the disk 20, as discussed further below.

The controller 110 may use the servo information in the servo wedges $22_0$-$22_N$ to keep the transducer head on a desired track during track following. To do this, the controller 110 may read servo information (e.g., servo burst) each time the transducer head passes over a servo wedge $22_0$-$22_N$, process the read servo information to determine the position of the transducer head, and generate a position error signal (PES) indicating the deviation of the head position from the desired track 115. The controller 110 may then generate a control signal 128 to the VCM and a control signal 130 to the small actuator based on the PES to adjust the position of the transducer in a direction that keeps the transducer head on track.

To write data to the disk 20, the controller 110 may first position the transducer head at a desired track 115 on the disk 20 by sending a control signal input 128 (e.g., control current) to the VCM and a control signal 130 to the small actuator for fine positioning. When the transducer head is properly positioned, the controller 110 may write the data to the disk 20 by sending a write signal 126 to the transducer head. To read data from the disk 20, the controller 110 may first position the transducer head at a desired track 115, receive a read signal 126 from the transducer head, and process the read signal 126 to recover the data from the disk 20. The write/read signal 126 may be carried between the controller 110 and the transducer head via the flex circuit assembly 54 shown in FIG. 1. The disk drive 10 also comprises preamp circuitry 135 configured to amplify the write/read signal 126. The preamp circuitry 135 may be integrated in a die that is mounted on the flex circuit assembly 54, as discussed further below.

FIG. 2 only shows one of the disk surfaces 20 for each of illustration. As discussed above with reference to FIG. 1, the disk drive 10 may comprise a plurality of disks 20, 22, in which each surface of the disks 20, 22 may be used to store data. For each disk surface, the disk drive may comprise a separate actuator arm 34, suspension assembly 36 and transducer head for reading data from and writing data on the disk surface. The preamp circuitry 135 may comprise at least one preamplifier for each disk surface. The controller 110 may select one of the transducer heads to read from or write on one of the disk surfaces by activating one or more amplifiers in the preamp circuitry 135 corresponding to the selected head, as discussed below.

Figure 3:
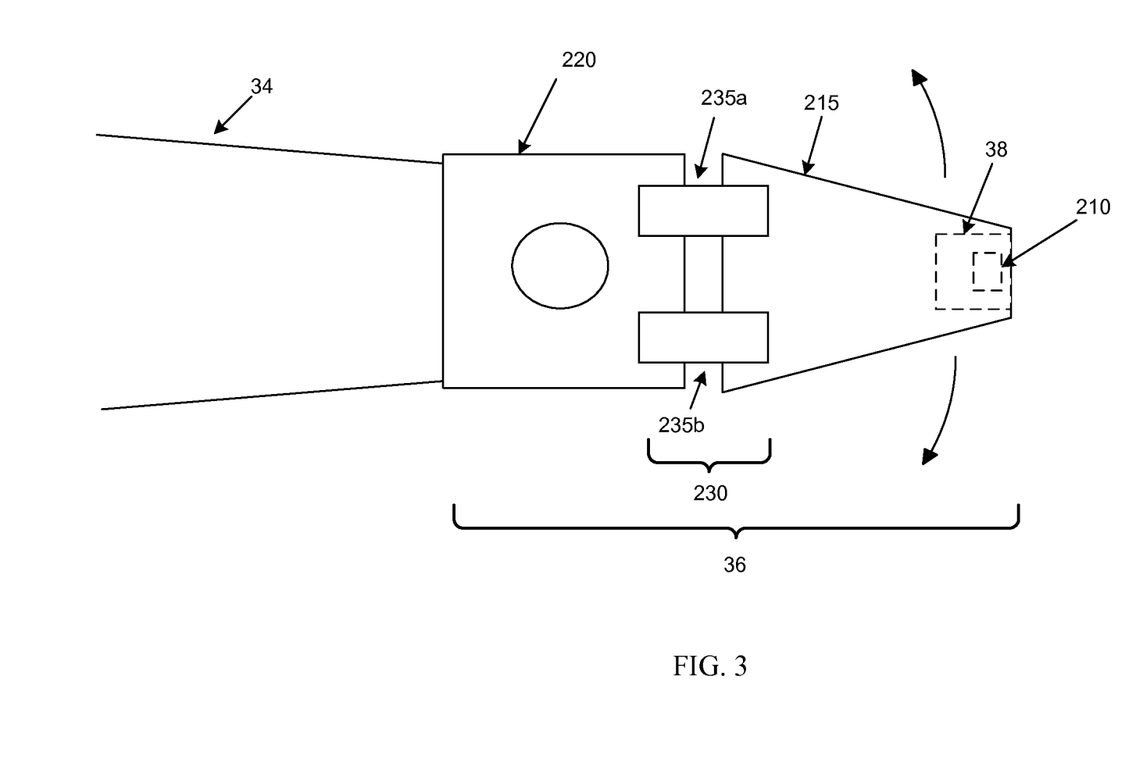
FIG. 3 shows an example of an actuator according to an embodiment of the present invention.

FIG. 3 shows a top view of the suspension assembly 36 for one of the disk surfaces according to an embodiment of the present invention. The suspension assembly 36 includes a mount plate 220 used to attach the suspension assembly 36 to the respective actuator arm 34. The suspension assembly also includes a load beam 215 that supports the slider 38 and the transducer head 210. The slider 38 and transducer head 210 are shown in dashed line to indicate that they are mounted on the bottom surface of the load beam 215. The suspension assembly 36 also includes a small actuator 230 to provide fine positioning of the transducer head.

In one embodiment, the small actuator 230 comprises a first piezoelectric element 235a and a second piezoelectric element 235b coupled between the mount plate 220 and the load beam 215. The length of each piezoelectric element 235a and 235b may be modulated by applying a voltage across the piezoelectric element 235a and 235b. The load beam 215 may be pivoted with respective to the mount plate 220, and hence the actuator arm 34, by applying different voltages to the piezoelectric elements 235a and 235b. Applying different voltages to the piezoelectric elements 235a and 235b causes the relative lengths of the piezoelectric elements 235a and 235b to change, thereby causing the load beam 215 to pivot with respect to the mount plate 220.

Thus, the controller 110 can fine position the transducer head 210 by sending controlled voltages 130 to the piezoelectric elements 235a and 235b to pivot the lead beam 215 with respect to the mount beam 220. The controller 110 can pivot the load beam 215 in either direction as shown by the arrows in FIG. 3. The controller 110 may send the controlled voltages 130 to the small actuator 230 via the flex circuit assembly 54 shown in FIG. 1. The controller 110 may also send a write signal to or receive a read signal from the transducer head 210 via the flex circuit assembly 54.

It is to be appreciated that embodiments of the present invention are not limited to the actuator shown in FIG. 3 and that other types of actuators may be used. For example, different numbers and/or arrangements of piezoelectric elements may be used to pivot the load beam 215 with respect to the mount plate 220 for fine positioning of the transducer head 210.

Figure 4:
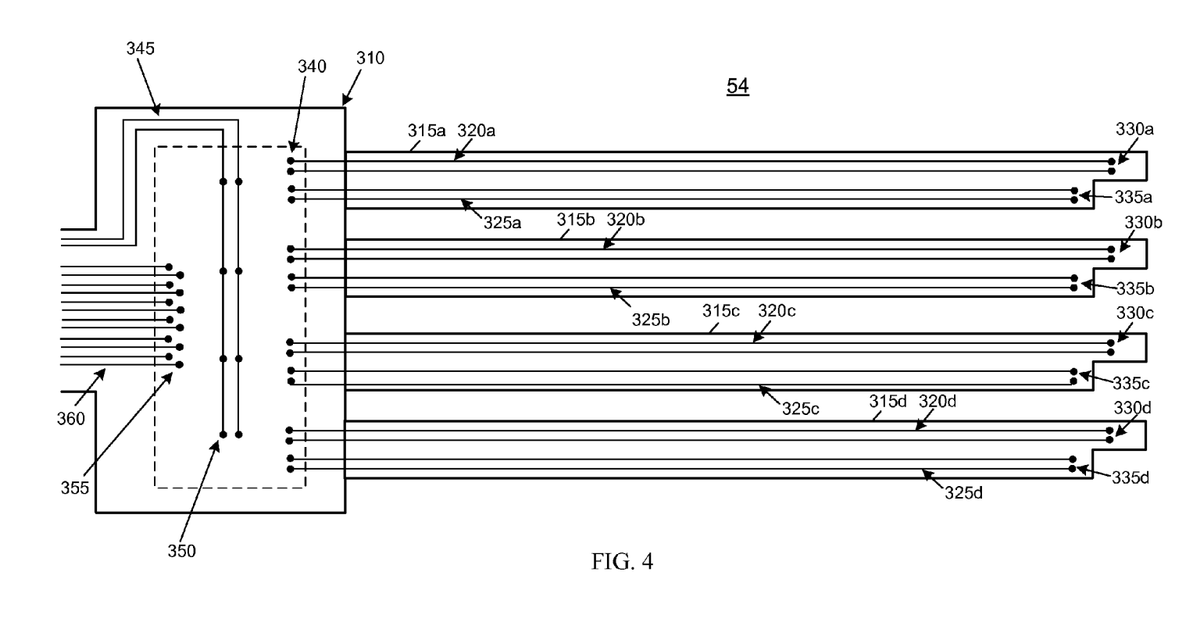
FIG. 4 shows a flex circuit assembly according to an embodiment of the present invention.

FIG. 4 shows a top view of the flex circuit assembly 54 according to an embodiment of the present invention. The flex circuit assembly 54 comprises a flex circuit having a main portion 310 and a plurality of elongated portions 315a to 315d extending from the main portion 310, where each elongated portion 315a and 315d corresponds to one of the transducer heads 210 for one of the disk surfaces. The flex circuit may comprise polyimide, polyether ether ketone (PEEK) or any other flexible material. The elongated portions 315a and 315d may made from the same piece of flexible material as the main portion 310 or may be made from different pieces that are attached to the main portion 310.

Each elongated portion 315a to 315d of the flex circuit includes a first plurality of conductive traces 320a to 320d for electrically coupling to the respective head transducer 210. The first plurality of traces 320a to 320d may include a conductive trace to carry the write signal to the respective transducer head 210 and a conductive trace to carry the read signal from the respective transducer head 210. It is to be appreciated that the first plurality of traces 320a to 320b may include any number of traces, and is not limited to the example shown in FIG. 4. The conductive traces 320a to 320d may comprise metal traces, e.g., copper traces. The first plurality of traces 320a to 320d may be electrically coupled to the respective head transducer 210 through contacts 330a and 330d. The contacts 330a and 330d may be connected to the respective transducer head 210 via another flex circuit, wires and/or other electrical connection.

Each elongated portion 315a to 315d of the flex circuit includes a second plurality of conductive traces 325a to 325b for electrically coupling to the respective small actuator 230. For the example actuator 230 shown in FIG. 3, the second plurality of traces 325a to 325d may include a conductive trace to carry the control voltage 130 to one of the piezoelectric elements 235a of the respective actuator 230 and a conductive trace to carry the control voltage 130 to the other piezoelectric element 235b. The second plurality of traces 325a to 325d may be electrically coupled to the respective piezoelectric elements 235a and 235b through contacts 335a and 335d. The contacts 335a and 335d may be connected to the respective piezoelectric elements 235a and 235b via another flex circuit, wires, and/or other electrical connection.

The main portion 310 of the flex circuit includes a plurality of contacts 340 connected to the first plurality of traces 320a to 320d and the second plurality of traces 325a to 325d. As discussed further below, the contracts 340 are used to electrically couple the traces 320a to 320d and 325a to 325d to a die that is mounted on the main portion 310 of the flex circuit. The die is not shown in FIG. 4 for ease of illustration. The dashed line in FIG. 4 indicates the area of the flex circuit on which the die is mounted.

The main portion 310 of the flex circuit also includes a plurality of conductive traces 360 and corresponding contacts 355. The conductive traces 360 may be electrically coupled to the controller 110 through the connector 56 shown in FIG. 1. The contacts 355 are used to electrically coupled the traces 360 to the die (not shown in FIG. 4) mounted on the flex circuit.

The main portion 310 of the flex circuit further includes a plurality of conductive traces 345 that run underneath the die mounted on the die. As discussed further below, these traces 345 are used to provide a power supply voltage to the die through contacts 350 distributed along the traces 345. It is to be appreciated that the trace layout shown in FIG. 4 is exemplary only and that different numbers of traces and/or different trace layouts may be used.

Figure 5:
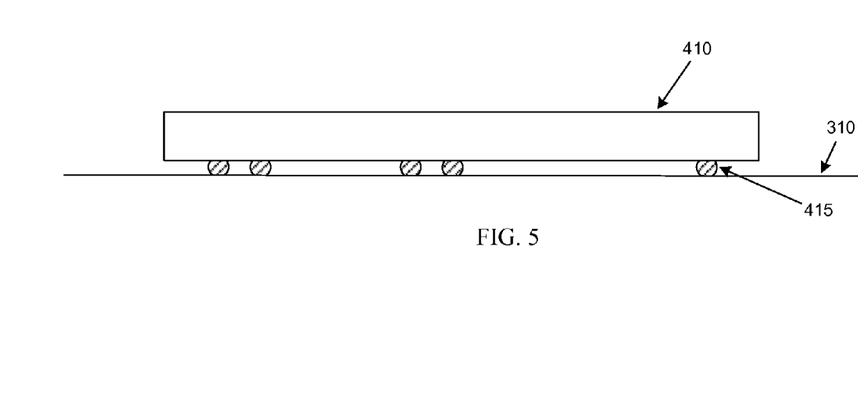
FIG. 5 shows an example of a flip-chip mounted die according to an embodiment of the present invention.

FIG. 5 shows a side view of the die 410 flip-chip mounted onto the main portion 310 of the flex circuit. The die 410 is electrically coupled to the traces of the flex circuit through bumps 415 (e.g., solder bumps) located at the contacts of the traces.

Figure 6A:
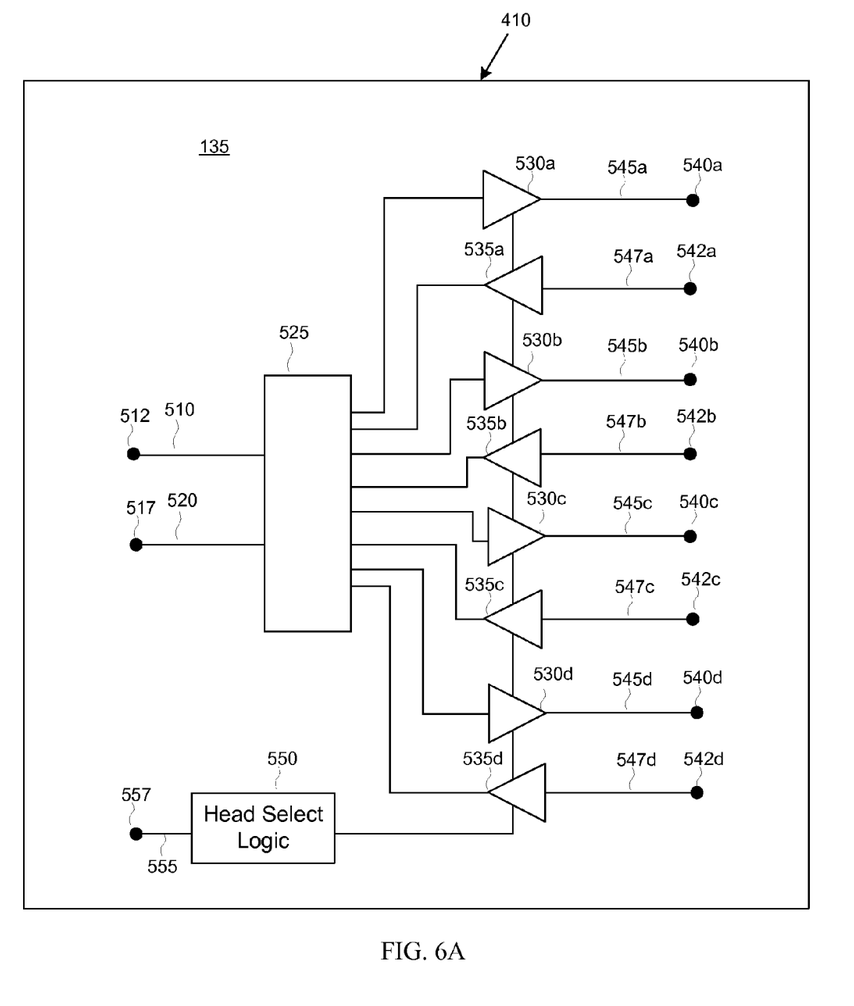
FIG. 6A shows preamp circuitry of a die according to an embodiment of the present invention.

FIG. 6A shows an example of preamp circuitry 135 that may be integrated in the die 410 according to an embodiment of the present invention. The preamp circuitry 135 comprises a first plurality of preamplifiers 530a to 530d, where each preamplifier 530a to 530d is configured to amplify a write signal to a respective one of the transducer heads 210. The die 410 includes traces 545a-545d for electrically coupling the outputs of the preamplifiers 530a to 530d to flex circuit traces 320a to 320d for the respective transducer heads 210. The die traces 545a to 545d are electrically coupled to the flex circuit traces 320a to 320d at their respective contacts 540a to 540d and 340 via solder bumps 415, as shown in FIG. 5.

The preamp circuitry 135 also comprises a second plurality of preamplifiers 535a to 535d, where each preamplifier 535a to 535d is configured to amplify a read signal from a respective one of the transducer heads 210. The die 410 includes traces 547a to 547d for electrically coupling the inputs of the preamplifiers 535a to 535d to flex circuit traces 320a to 320d for the respective transducer heads 210. The die traces 547a to 547d are electrically coupled to the flex circuit traces 320a to 320d at their respective contacts 542a to 542d and 340 via solder bumps 415, as shown in FIG. 5. The second plurality of preamplifiers 535a to 535d and the first plurality of preamplifiers 530a to 530d may be coupled to different ones of the flex circuit traces 320a to 320d.

The preamp circuitry 135 further comprises combine circuitry 525, a write trace 510, a read trace 520 and head select logic 550. The combine circuitry 525 is configured to couple the inputs of the first plurality of preamplifiers 530a to 530d to the write trace 510. The write trace 510 may be electrically coupled to a write channel of the controller 110 via one of the flex circuit traces 360. The write trace 510 may be electrically coupled to the flex circuit trace 360 at their respective contacts 512 and 355 via a solder bump 415, as shown in FIG. 5. In one embodiment, the head select logic 550 may be configured to select one of the transducer heads for a write operation by powering the corresponding one of the preamplifiers 530a to 530d based on a control signal from the controller 110. The head select logic 550 may be electrically coupled to the controller 110 via die trace 555 and one of the flex circuit traces 360. The die trace 555 may be electrically coupled to the flex circuit trace 360 at their respective contacts 557 and 355 via a solder bump 415.

The combine circuitry 525 is also configured to couple the outputs of the second plurality of preamplifiers 535a to 535d to the read trace 520. The read trace 520 may be electrically coupled to a read channel of the controller 110 via one of the flex circuit traces 360. The read trace 520 may be electrically coupled to the flex circuit trace 360 at their respective contacts 517 and 355 via a solder bumpy 415. In one embodiment, the head select logic 550 may be configured to select one of the transducer heads for a read operation by powering the corresponding one of the preamplifiers 535a to 535d based on a control signal from the controller 110.

The preamp circuitry 135 of the die 410 may be fabricated using a multi-layer semiconductor fabrication process. Further, the preamplifiers 530a to 530d and 535a to 535d may be electrically coupled to the flex circuit traces 345 at the contacts 355 to receive a power supply voltage from a power supply.

Figure 6B:
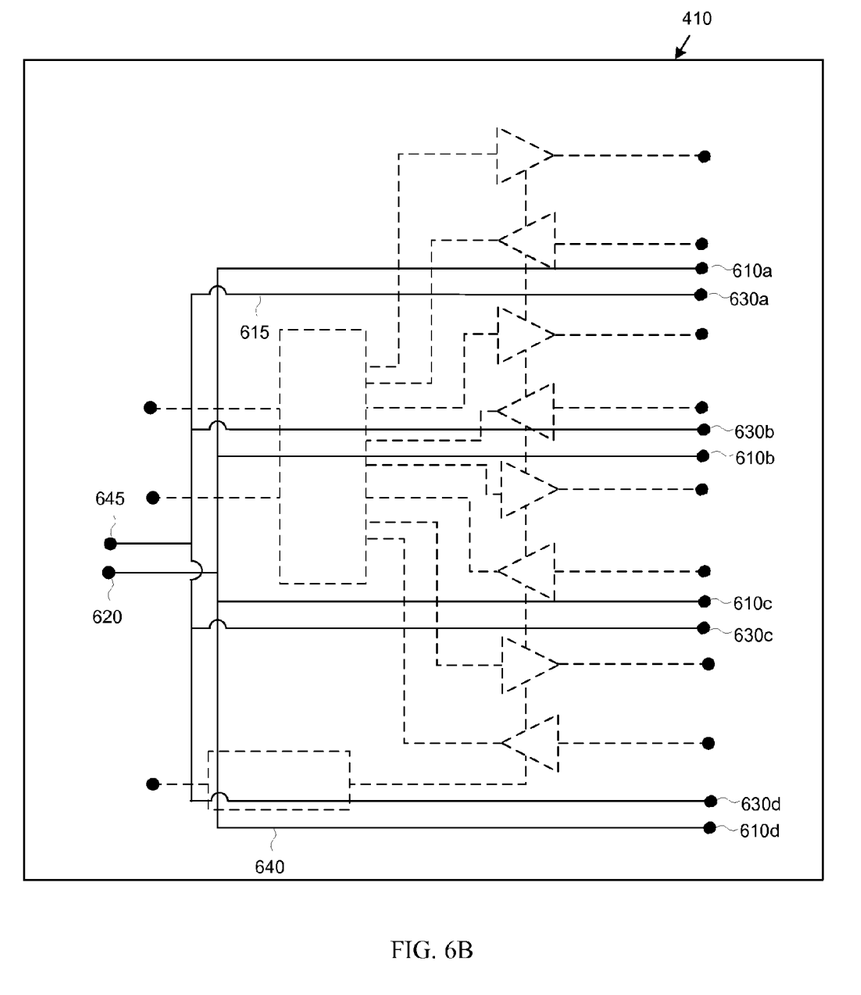
FIG. 6B shows bypass traces of the die that are electrically isolated from the preamp circuitry according to an embodiment of the present invention.

FIG. 6B shows a plurality of bypass traces 615 and 640 in the die 410 according to an embodiment of the present invention. The bypass traces 615 and 640 are used to route control signals for the small actuators 230 through the die 410. The bypass traces 615 and 640 are electrically isolated from the preamplifier circuitry 135. In FIG. 6B, the preamplifier circuitry 135 is shown in dashed lines to indicate that the preamplifier circuitry 135 is electrically isolated from the bypass traces. The bypass traces 615 and 640 may be electrically coupled to the small actuators 230 via flex circuit traces 325a to 325d for the small actuators 230. The bypass trace 615 may be electrically coupled to the flex circuit traces 325a to 325d at their respective contacts 610a to 610d via solder bumps 415 and the bypass trace 640 may be electrically coupled to different ones of the flex circuit traces 325a to 325d at their respective contacts 630a to 630d by solder bumps 415, as shown in FIG. 5. The bypass traces 615 and 640 may also be electrically coupled to the controller 110 via flex circuit traces 360 to receive control signals from the controller 110 and pass the control signals through the die 410 to the small actuators.

Figure 7A:
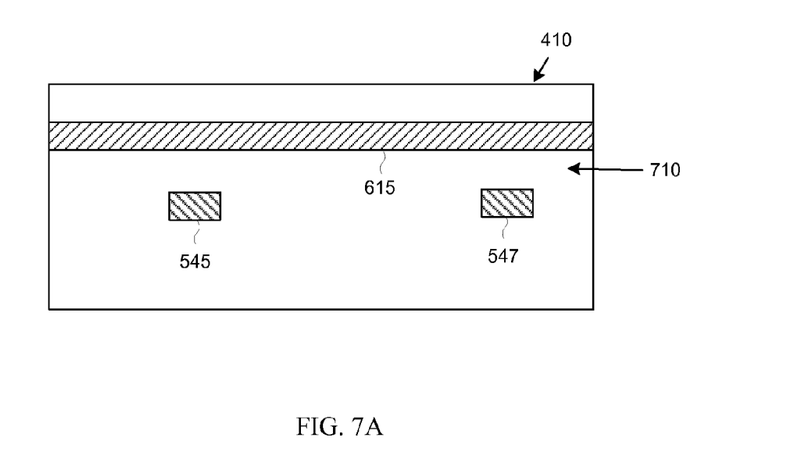
FIG. 7A shows an example of a cross-sectional view of the die according to an embodiment of the present invention.
Figure 7B:
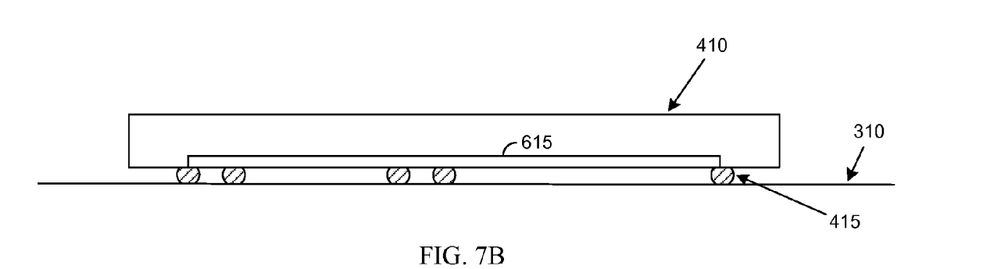
FIG. 7B shows a side view of the die and an example of the path of a trace through the die according to an embodiment of the present invention.

The bypass traces 615 and 640 may be electrically isolated from the preamplifier circuitry 135 by insulator layers (e.g., oxide layers) in the die 410. An example of this is shown in FIG. 7A, which shows a cross-sectional view of the die 410. FIG. 7A shows a portion of bypass trace 615 which crosses over preamplifier traces 545 and 547. In the example in FIG. 7A, the bypass trace 615 is orientated parallel to FIG. 7A and the preamplifier traces 545 and 547 are orientated orthogonal to FIG. 7A. FIG. 7A also shows an insulator layer 710 disposed between the bypass trace 615 and the preamplifier traces 545 and 547. The insulator layer 710 electrically isolates the bypass trace 615 from the preamplifier traces 545 and 547. In the example in FIG. 7A, the bypass trace 615 and the preamplifier traces 545 and 547 may correspond to different metal layers of a multi-layer semiconductor fabrication process. The different metal layers of the die 410 may be electrically coupled to contacts on the top of the die 410 through vias (not shown), which are used to interconnect different metal layers of the die 410. FIG. 7B is a side view of the die 410 showing an example of the path of the bypass trace through the die 410.

Thus, the bypass traces 615 and 640 allow the control signals for the small actuators to pass through the die 410. An advantage of this embodiment is that the traces for the control signals do not have to be routed around the die 410. Routing the traces for the control signals around the die 410 may create interconnect issues on the flex circuit. For example, when the flex circuit only has a single layer of traces, it may be difficult to route the traces for the controls signals around the die 410 without crossing the traces for the transducer heads.

Further, the bypass traces 615 and 640 are electrically isolated from the preamp circuitry 135 of the die 410, hereby keeping the control signals for the small actuators (e.g., dual state actuator) electrically isolated from the preamp circuitry 135. This is important in cases where the control signals for the small actuators comprise voltages that are greater than the maximum operating voltage of the preamp circuitry 135. For example, the control signals may comprise a high voltage of 20V. In this example, the preamplifiers of the preamp circuitry 135 may operate from +/−5V power supply rails and cannot handle voltages above this level. By electrically isolating the bypass traces from the preamp circuitry 135, embodiments of the present invention are able to pass the high voltages of the control signals through the die 410 without impacting operation of the preamp circuitry 135.

Referring back to FIG. 6B, for the example actuator 230 shown in FIG. 3, bypass trace 615 may be electrically coupled to one of the piezoelectric elements of each of the actuators 230 via flex circuit traces 325a to 325d. Bypass trace 640 may be electrically coupled to the other one of the piezoelectric elements of each of the actuators 230 via different ones of the flex circuit traces 325a to 325d. In this embodiment, the controller 110 may output two control signals, where each control signal controls one of the piezoelectric elements of each actuator 230. One of the control signals may be routed to one of the piezoelectric elements of each of the actuators 230 through bypass trace 615, and the other control signal may be routed to the other one of the piezoelectric elements of each of the actuators 230 through bypass trace 640. As shown in the example in FIG. 6B, each bypass trace 615 and 640 receives the respective control signal from the controller 110 and branches off in the die 410 to each actuator 230. It is to be appreciated that embodiments of the present invention are not limited to the actuator 230 shown in FIG. 3 and that the bypass traces may branch off to other types of actuators.

Figure 8:
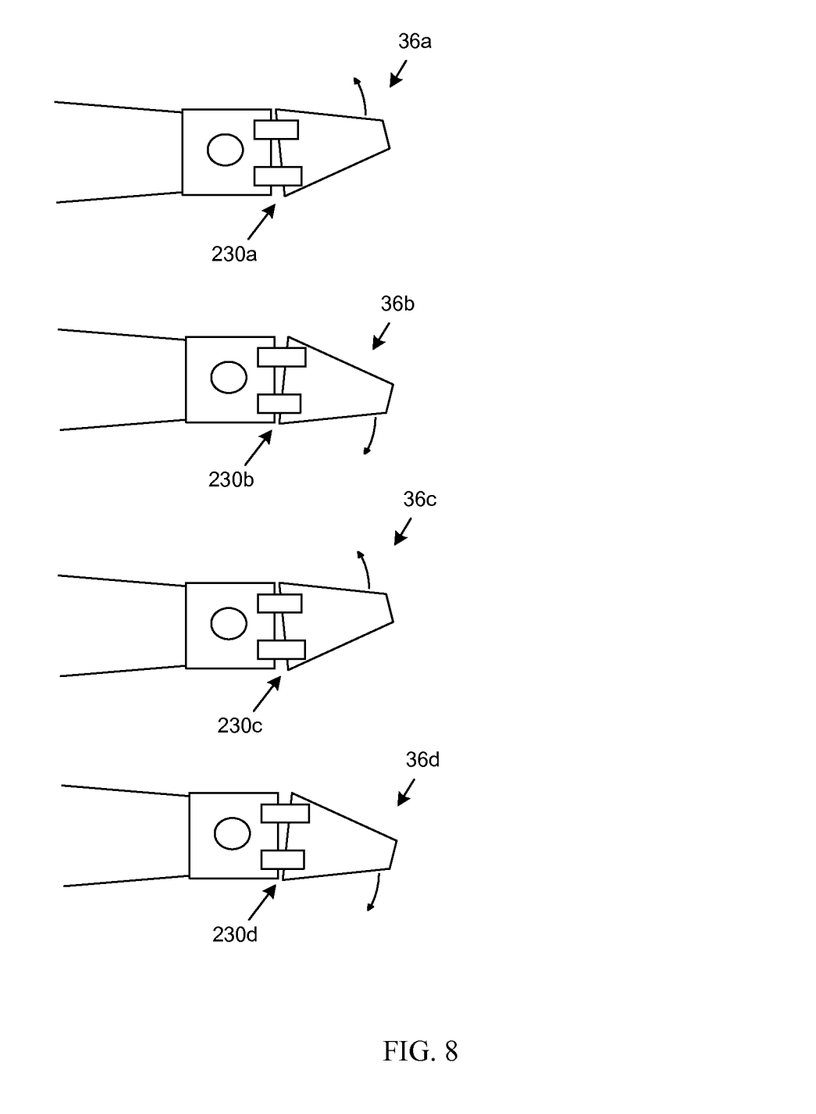
FIG. 8 shows an example of a stack of actuators for maintaining mass balance according to an embodiment of the present invention.

In this embodiment, when the controller 110 sends one or more control signals to a actuator 230 to position a selected head, the actuators 230 for the other heads move as well. This is because each bypass trace 615 and 640 is coupled to one of the piezoelectric elements of each actuator 230. In this embodiment, the bypass traces 615 and 640 may be coupled to the actuators 230 so that when the actuator 230 corresponding to the selected head moves in one direction, half of the actuators 230 move in the same direction and the other half of the actuators 230 move in the opposite direction, an example of which is shown in FIG. 8 discussed below. This may be achieved by coupling bypass trace 615 to the first piezoelectric element 235a of half of the actuators 230 and to the second piezoelectric element 235b of the other half of the actuators 230, and vice versa for bypass trace 640. Thus, each bypass trace 615 and 640 may receive one of the control signals and distribute the respective control to the actuators 230 so that the respective control signal causes half of the actuators to move in one direction and the other half of the actuators to move in the opposite direction.

FIG. 8 shows an example of a disk drive comprising four suspension assemblies 36a to 36d corresponding to four different disk surfaces. Although the four suspension assemblies 36 to 36d are shown side by side in FIG. 8 for ease of illustration, it is to be understood that the suspension assemblies 36a and 36d are stacked vertically to access different surfaces of the disks 20, 22 shown in FIG. 1. In this example, when the actuator 230a of one of the suspension assemblies pivots the respective load beam in one direction, half of the actuators 230a and 230c pivot in the same direction and the other half of the actuators 230b and 230d pivot in the opposite direction, as shown in FIG. 8. This may be done to balance the mass of the head stack assembly. In the example in FIG. 8, every other actuator 230a and 230c pivots in the same direction. As another example, the top two actuators 230a and 230b may pivot in the same direction, while the bottom two actuators 230c and 230d pivot in the opposite direction.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive, comprising:
   a disk;
   a head configured to write data to and read data from the disk;
   an actuator configured to position the head relative to the disk; and
   a die including internal circuitry electrically coupled to the head and a bypass trace electrically coupled to the actuator, wherein the internal circuitry comprises one or more preamplifiers and the bypass trace is electrically isolated from the internal circuitry.

2. The disk drive of claim 1, further comprises an actuator arm, wherein the actuator comprises a piezoelectric element configured to move the head relative to the actuator arm when a voltage is applied across the piezoelectric element.

3. The disk drive of claim 2, further comprising an arm actuator configured to rotate the actuator arm about a pivot.

4. The disk drive of claim 1, wherein at least one of the one or more preamplifiers is configured to amplify a read signal from a read channel and output the amplified read signal to the head.

5. The disk drive of claim 4, wherein at least one of the one or more preamplifiers is configured to amplify a write signal from the head and output the amplified write signal to a write channel.

6. The disk drive of claim 1, wherein the die comprises an insulator layer disposed between the bypass trace and the internal circuitry to electrically isolate the bypass trace from the internal circuitry.

7. The disk drive of claim 1, further comprising an actuator controller configured to output a voltage to the actuator through the bypass trace of the die, wherein the voltage is greater than a maximum operating voltage of the one or more preamplifiers.

8. The disk drive of claim 1, further comprising a flex circuit, wherein the die is mounted on the flex circuit, and the one or more preamplifiers and the bypass trace are electrically coupled to different traces in a single layer of the flex circuit.

9. A disk drive, comprising:
a plurality of disks;
a plurality of heads, wherein each head is configured to write data to and read data from one of the disks;
a plurality of actuators, wherein each actuator is configured to position one of the heads relative to the respective disk; and
a die including internal circuitry electrically coupled to the heads and a plurality of bypass traces electrically coupled to the actuators, wherein the internal circuitry comprises a plurality of preamplifiers and the bypass traces are electrically isolated from the internal circuitry.

10. The disk drive of claim 9, further comprising a plurality of actuator arms, wherein each actuator arm corresponds to one of the heads and each actuator comprises a piezoelectric element configured to move the respective head relative to the respective actuator arm.

11. The disk drive of claim 10, further comprising an arm actuator configured to rotate the actuator arms above a pivot.

12. The disk drive of claim 9, wherein the plurality of preamplifiers comprises a first plurality of preamplifiers, wherein each of the first plurality of preamplifiers is configured to amplify a read signal from a read channel and output the amplified read signal to one of the heads.

13. The disk drive of claim 12, wherein the plurality of preamplifiers comprises a second plurality of preamplifiers, wherein each of the second plurality of preamplifiers is configured to amplify a write signal from one of the heads and output the amplified write signal to a write channel.

14. The disk drive of claim 9, wherein the die comprises an insulator layer disposed between the bypass traces and the internal circuitry to electrically isolate the bypass traces from the internal circuitry.

15. The disk drive of claim 9, further comprising an actuator controller configured to select one of the actuators and to output a voltage to the selected actuator through the respective bypass trace of the die, wherein the voltage is greater than a maximum operating voltage of the plurality of preamplifiers of the die.

16. The disk drive of claim 1, further comprising a flex circuit, wherein the die is mounted on the flex circuit, and the preamplifiers and the bypass traces are electrically coupled to different traces in a single layer of the flex circuit.

17. The disk drive of claim 16, wherein the die is flip-chip mounted on the flex circuit.

18. The disk drive of claim 16, wherein the flex circuit comprises a plurality of elongated portions, each elongated portion corresponding to one of the heads and one of the actuators, and each elongated portion is configured to electrically couple at least one of the preamplifiers of the die to the respective head and electrically couple at least one of bypass traces to the respective actuator.

19. The disk drive of claim 18, wherein the flex circuit is configured to flex in response to movement of an actuator arm.

20. The disk drive of claim 9, wherein at least one of the bypass traces is coupled to each actuator.

21. The disk drive of claim 20, wherein the at least one of the bypass traces is configured to distribute a control signal to each actuator such that half of the actuators move in a first direction and half of the actuators move in a second direction in response to the control signal.

22. The disk drive of claim 21, wherein the first direction and the second direction are substantially opposite to each other.

* * * * *